(No Model.)

H. P. COPE.
FLOAT VALVE.

No. 444,335. Patented Jan. 6, 1891.

Witnesses
Geo. N. Lothrop
Gertrude H. C. Anderson

Inventor
Henry P. Cope

UNITED STATES PATENT OFFICE.

HENRY P. COPE, OF DETROIT, MICHIGAN, ASSIGNOR TO COPE BROTHERS, OF SAME PLACE.

FLOAT-VALVE.

SPECIFICATION forming part of Letters Patent No. 444,335, dated January 6, 1891.

Application filed May 3, 1890. Serial No. 350,467. (No model.)

*To all whom it may concern:*

Be it known that I, HENRY P. COPE, of Detroit, in the county of Wayne and State of Michigan, have invented a new and useful Improvement in Float-Valves, of which the following is a specification.

My invention consists in an improvement in float-valves, hereinafter fully described and claimed.

Figure 2:
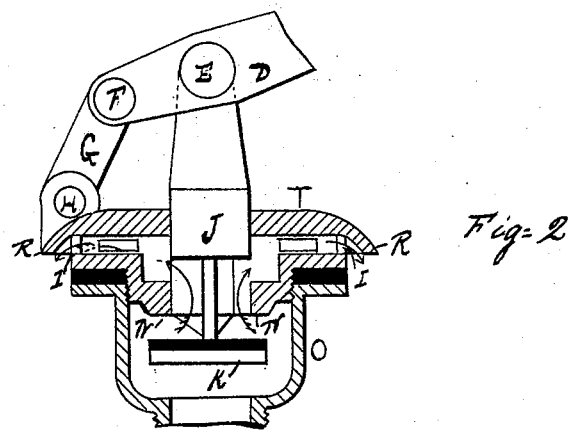
Figure 1:
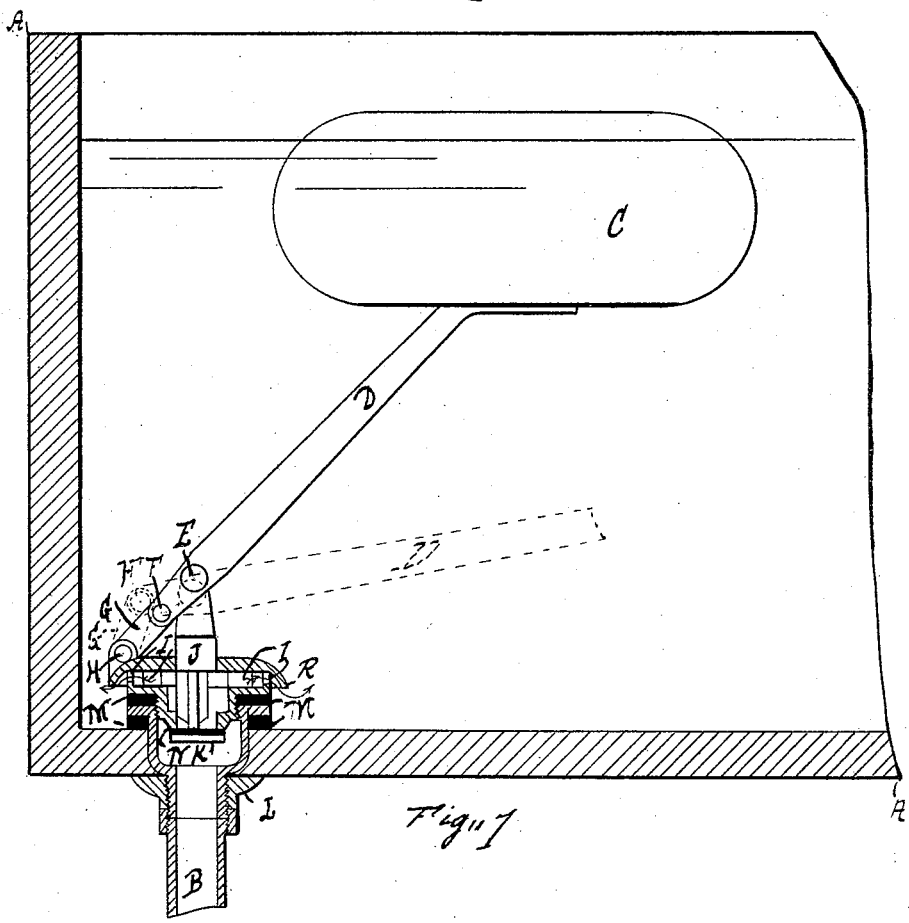

Figure 1 is a section through the valve and a portion of a tank, and Fig. 2 is an enlarged similar section through the valve.

The objects of my invention are to avoid the necessity of using a float which will retain its buoyancy unimpaired and to do away with the noise of the entering water when the tank is being filled.

A represents a tank to be filled with water to a defined height from the inlet-pipe B.

O represents a shell adapted to be secured in the wall of the tank by a shoulder and gasket M within the tank and a lock-nut L without the tank in an ordinary and well-understood way. The inlet-pipe B, leading from a source of water-supply, is connected with shell O.

T represents a bell having a downwardly-extending rim R, formed to connect with the upper end of shell O and having a valve-seat N, formed on its lower end.

J represents a valve-stem which passes somewhat snugly through the upper part of bell T, and then passes down through valve-seat N, being here partly cut away to form water-ways around said stem, and carries on its lower end a valve K, which closes against valve-seat N with the water-current and opens against the water-current.

I I represent water-ways opening through the wall of bell T, under rim R, whereby water passing through said openings is converted by said rim into a thin sheet and enters the tank noiselessly, no matter how high its pressure.

D represents a lever pivoted near one end of the valve-stem J and carrying on its other end the float C, which does not require to be buoyant. I generally use for float C a piece of hard wood, painted to preserve it. The short arm of lever D is pivoted at F to one end of a link G, the other end of which is pivoted at H to bell T. By varying the proportions of the arms of lever D and the respective angles of said lever and the link G when valve K is closed the effect of float C upon stem J at the moment of opening valve K may be varied to suit varying water-pressures upon the valve.

When the tank is filled to the desired height, the valve K will be pressed against the seat N by the water-pressure and by any buoyancy which float C may have. When the water falls below the desired level, float C will be left unsupported, and its weight will force valve K away from its seat and permit water to enter the tank. The arrows show the direction of the current.

What I claim as my invention, and desire to secure by Letters Patent, is—

1. The combination, with a tank having an inlet-pipe, of a cup-shaped rim R, located at the upper end of the pipe and having its wall provided with water-ways, a valve-seat below the rim, a valve closing upwardly with the water-current, and a float in the tank, connected with the valve, substantially as described.

2. The combination, with a valve, of the bell T, having a valve-seat, an internal water-way, the water-ways I through its wall, and the rim R, substantially as shown and described.

HENRY P. COPE.

Witnesses:
HENRY B. LOTHROP,
GERTRUDE H. ANDERSON.